United States Patent

Yoshida

[11] Patent Number: 5,943,364
[45] Date of Patent: *Aug. 24, 1999

[54] DATA COMMUNICATION APPARATUS FOR SETTING BIT RATE ACCORDING TO LINE QUALITY

[75] Inventor: Takehiro Yoshida, Tokyo, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/601,549

[22] Filed: Feb. 14, 1996

[30] Foreign Application Priority Data

Feb. 16, 1995 [JP] Japan ................................ 7-028086

[51] Int. Cl.$^6$ ........................................... H04B 1/38
[52] U.S. Cl. ............................................. 375/222
[58] Field of Search ............................. 375/58, 222, 225; 370/84

[56] References Cited

U.S. PATENT DOCUMENTS

| | | | |
|---|---|---|---|
| 4,236,248 | 11/1980 | Teramura et al. | 375/222 |
| 4,736,388 | 4/1988 | Eguchi | 375/58 |
| 4,910,506 | 3/1990 | Yoshida et al. | 340/825 |
| 5,008,902 | 4/1991 | Key et al. | 375/225 |
| 5,157,651 | 10/1992 | Ghelberg et al. | 370/84 |
| 5,239,576 | 8/1993 | Yoshida et al. | 379/355 |
| 5,247,546 | 9/1993 | Abbiate et al. | 370/84 |
| 5,297,186 | 3/1994 | Dong | 375/222 |
| 5,347,539 | 9/1994 | Sridhar et al. | 375/222 |
| 5,349,635 | 9/1994 | Scott | 375/222 |
| 5,491,565 | 2/1996 | Naper | 358/468 |
| 5,491,720 | 2/1996 | Davis et al. | 375/225 |
| 5,513,208 | 4/1996 | Meada | 375/222 |
| 5,524,122 | 6/1996 | Lepitre et al. | 375/225 |

Primary Examiner—Stephen Chin
Assistant Examiner—Joseph Roundtree
Attorney, Agent, or Firm—Fitzpatrick, Cella, Harper & Scinto

[57] ABSTRACT

A data communication apparatus includes a modem for determining a line quality and setting a transmission baud rate and a transmission bit rate in accordance with a result of the determination, and a control circuit for changing setting criteria of the baud rate and the bit rate of modem in accordance with the data received from the line through modem.

10 Claims, 12 Drawing Sheets

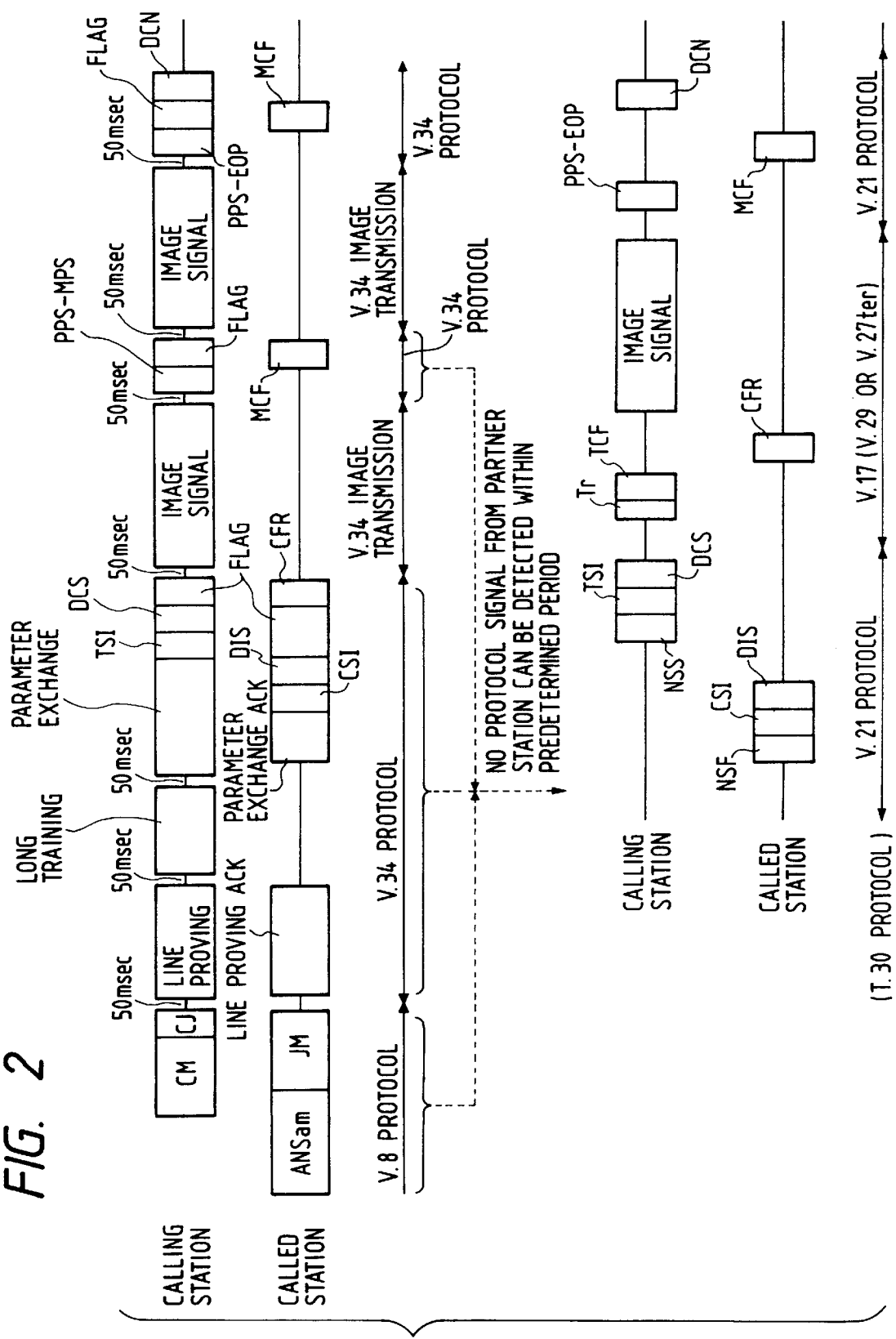

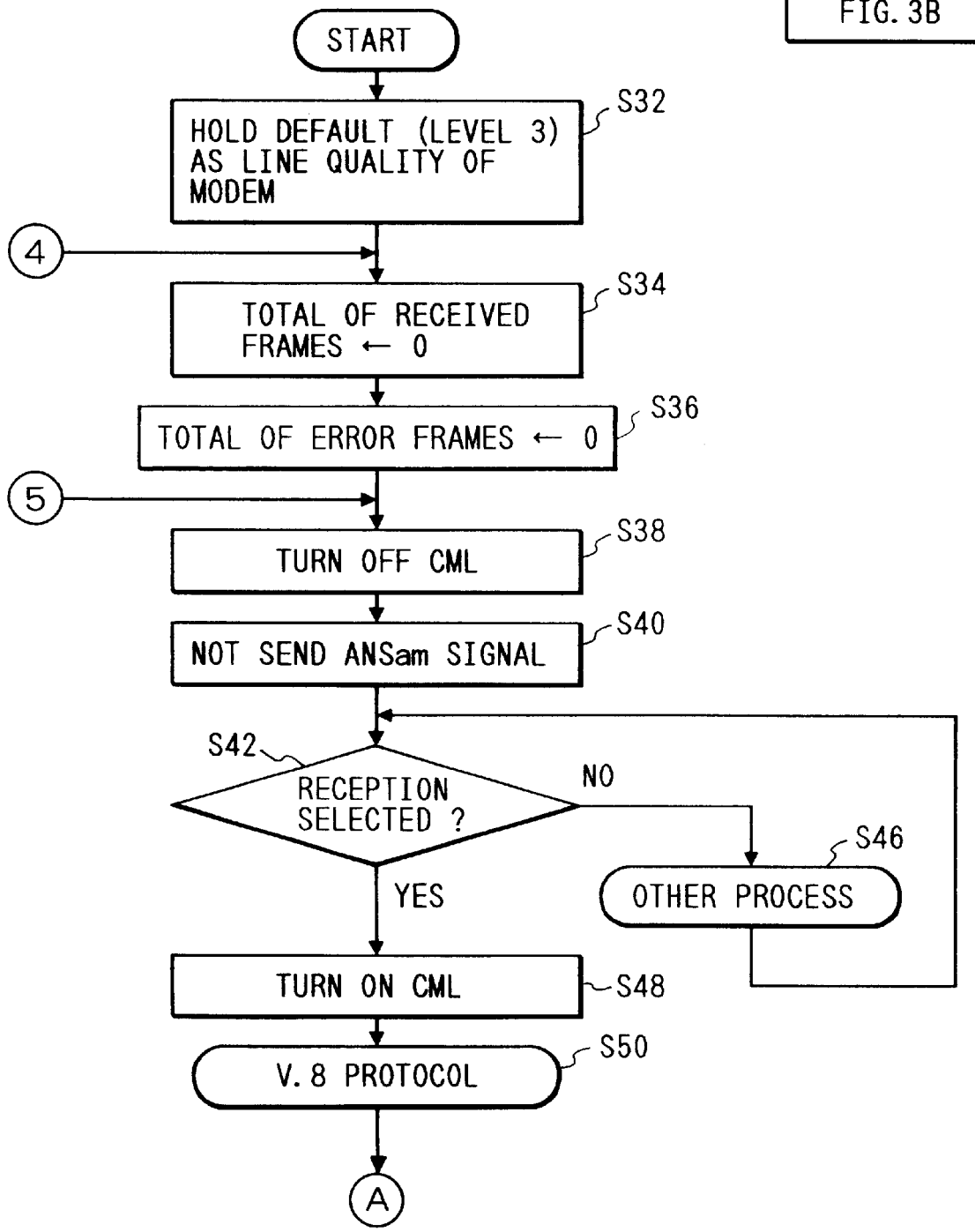
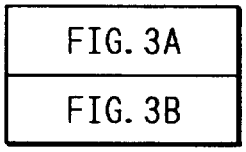
FIG. 3A

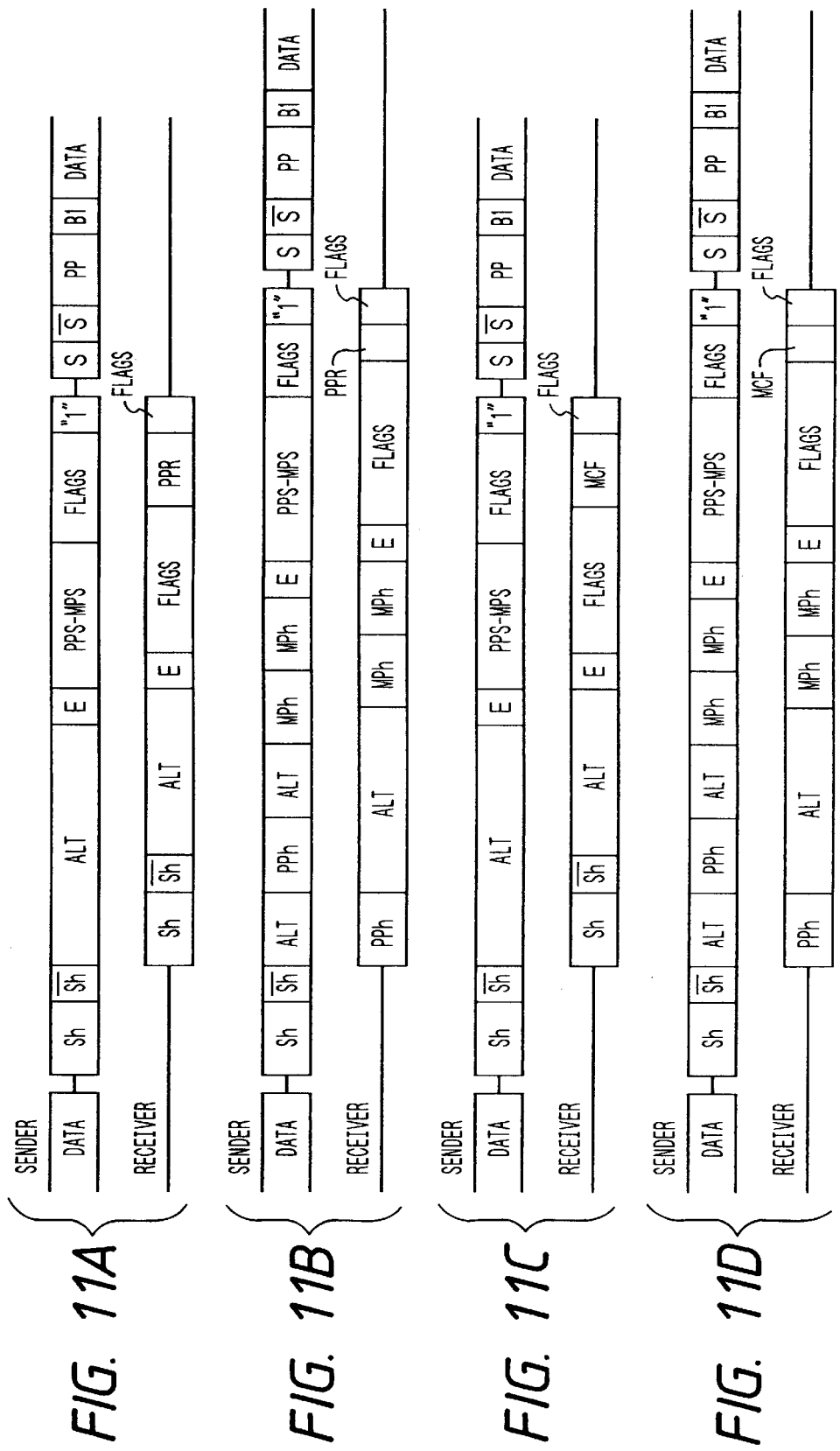

DATA COMMUNICATION APPARATUS FOR SETTING BIT RATE ACCORDING TO LINE QUALITY

BACKGROUND OF THE INVENTION

1. Field of the Invention

The present invention relates to a data communication apparatus for setting a transmission bit rate in accordance with line quality.

2. Related Background Art

In a prior art apparatus of this type, for example, in a facsimile apparatus, a TCF signal (training check signal) is received by a modem at a maximum transmission bit rate and a control unit of the facsimile apparatus determines whether the received TCF signal has been properly received or not. If the TCF signal has been properly received, it sends a CFR (confirmation to receive) signal to inform to the sending station that it is capable of receiving the image communication at that transmission bit rate and thereafter it conducts the image transmission at that transmission bit rate. If the TCF signal has not been properly received, it sends a FTT (failure to train) signal to inform to the sending station that it cannot conduct the image transmission at that transmission bit rate. When the sending station receives the FTT signal, it sets the transmission bit rate of the modem one step lower and resends the TCF signal. In this manner, the control unit of the facsimile apparatus sets the transmission bit rate of the modem to the transmission bit rate at which the TCF signal can be properly received.

The modem which complies with the V.34 recommendation has a function in the modem itself to set a transmission baud rate and a transmission bit rate by line proving, long training and parameter exchange with a modem of a destination station.

However, since the setting of the transmission baud rate and the transmission bit rate between the modems is conducted with the modem of the destination station by the function of its own modem separately from the actual image data communication, it may happen that it does not always correspond to the actual communication status of the image data.

As a result, when the transmission baud rate and the transmission bit rate established between modems do not correspond to the actual image data, many communication errors of the image data take place or a lower baud rate or bit rate may be set in spite of the fact that the image communication at a higher rate is attainable.

SUMMARY OF THE INVENTION

It is an object of the present invention to improve a data communication apparatus in light of the above problems.

It is another object of the present invention to improve a modem having a function of automatically setting a transmission baud rate and a transmission bit rate in accordance with a detection result of line quality such that setting criteria of the modem for the transmission baud rate and the transmission bit rate are changed in accordance with data received through the modem so that the baud rate and the bit rate which conform to the actual data communication are set.

Other objects of the present invention will be apparent from the following description and the drawings.

BRIEF DESCRIPTION OF THE DRAWINGS

FIG. 2 shows a communication sequence in the embodiment, FIG. 3, composed of FIGS. 3A and 3B, shows a flow chart of a control operation of the embodiment, FIGS. 11A to 11D show a communication sequence of another embodiment.

DETAILED DESCRIPTION OF THE PREFERRED EMBODIMENTS

The preferred embodiments of the present invention are now explained with reference to the accompanying drawings.

In the following embodiments, a facsimile apparatus is discussed although the present invention is equally applicable to any data communication apparatus of a full duplex communication type capable of communicating a protocol signal and data.

Figure 1:
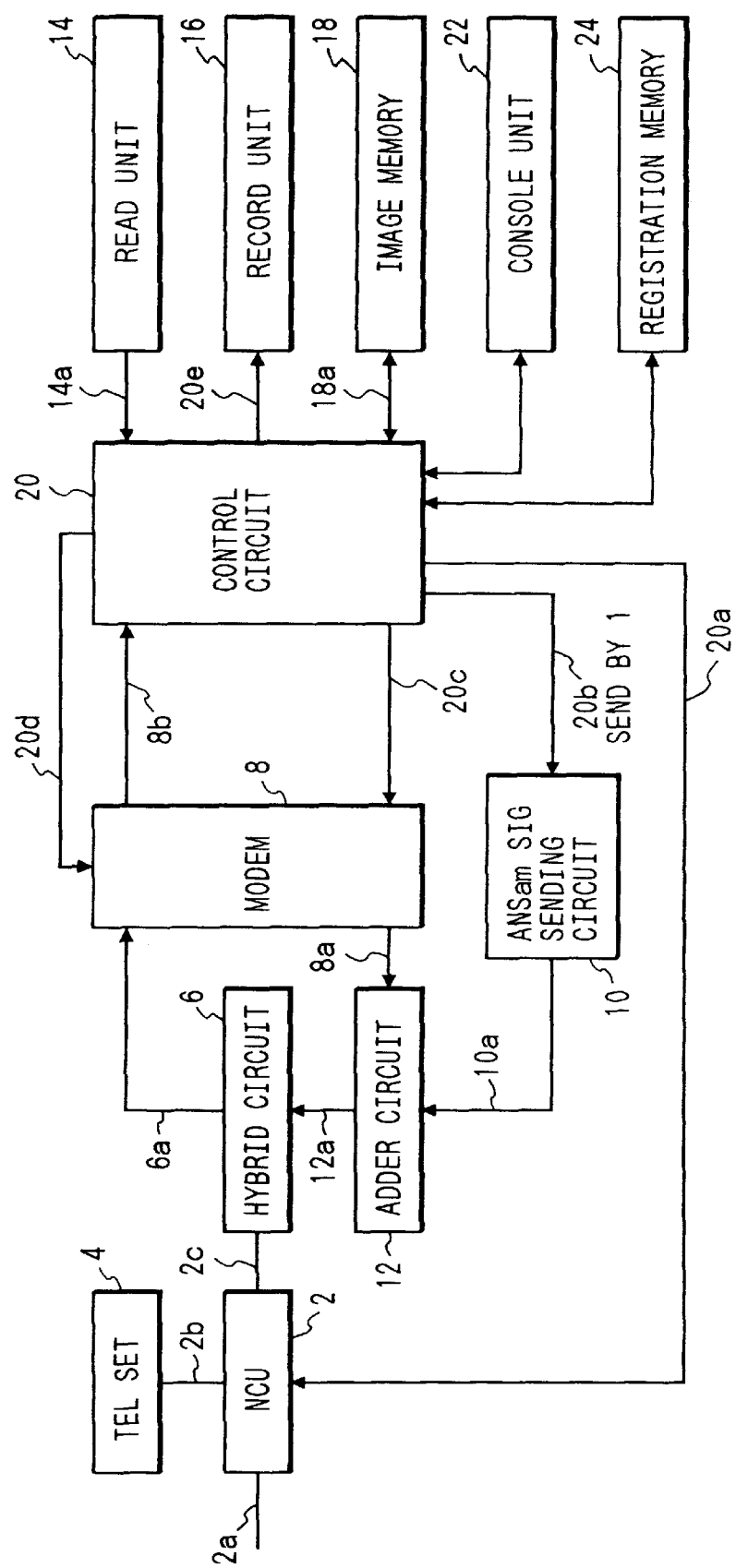
FIG. 1 shows a block diagram of a configuration of a facsimile apparatus of an embodiment.

FIG. 1 shows a block diagram of a configuration of a facsimile apparatus in accordance with one embodiment.

In FIG. 1, numeral 2 denotes an NCU (network control unit) which comprises a CML relay for selectively connecting a telephone line 2a of a public line network to a telephone set 4 and a hybrid circuit 6, a loop forming circuit for forming a line loop of the telephone line 2a and a CI detection circuit for detecting a calling signal (CI signal) from the telephone line 2a.

The hybrid circuit 6 separates a transmission channel signal and a receiving channel signal.

Numeral 8 denotes a modem which demodulates the receiving channel signal from the hybrid circuit 6 into digital data to output it to a control circuit 20 and modulates digital data from the control circuit 20 to output it to the hybrid circuit 6 as the transmission channel signal through an adder circuit 12. The modem 8 has functions of the V series Recommendations V.8, V.21 and V.34 for the modulation and demodulation of the protocol signal and functions of V.27ter, V.29, V.17 and V.34 for the modulation and demodulation of the image signal. The modulation/demodulation system and the transmission rate are switched by a control signal from the control unit 20. The modem 8 also has a function of automatically setting the baud rate and the bit rate in accordance with line quality. A setting criterion for the baud rate may be changed in five steps and the control circuit 20 sets the criterion signal of the modem 8 through a signal line 20d. The criterion for the line quality is least severe for the setting criterion 1, and gradually severer criteria are applied for the criteria 2, 3, 4 and 5.

Numeral 10 denotes an NASam signal sending circuit for sending an ANSam signal (a signal derived by modulating a signal of 2100 Hz) which disables an echo compressor or an echo canceler function of the public line network to send and receive a protocol signal of full duplex communication, to the line 2a through the adder circuit 12, the hybrid circuit 6 and the NCU 2. The ANSam signal sending circuit 10 sends the ANSam signal in accordance with a control signal from the control circuit 20.

Numeral 14 denotes a read unit for reading a document sheet and numeral 16 denotes a record unit for recording the image signal as an image.

Numeral 18 denotes an image memory for storing the read image data and the received image data.

Numeral 20 denotes the control circuit which comprises a microcomputer, a ROM and a RAM. The control circuit 20 controls the read unit 14, controls the record unit 16, controls the input of various key signals from a console unit 22, controls the display of a display unit on the console unit 22, controls the encoding and decoding (MH, MR or MMR encoding and decoding) of the image data, controls the switching of the modulation-demodulation system of the modem 8, controls the switching of the transmission rate, controls the transmission of the signal by the ANSam signal sending circuit 10 and controls the communication sequence of the transmission/reception of the protocol signal to be described later and the communication of the image data.

The present embodiment is now explained in brief.

In the present embodiment, the transmission and reception of the protocol signal and the image data of V.8 and V.34 by the full duplex communication are conducted. FIG. 2 shows a communication sequence of the present embodiment.

A called station responds to a call signal to send an ANSam signal (a signal derived by modulating a 2100 Hz signal by 15 Hz) from the ANSam signal sending circuit 10. The echo suppressor function or the echo canceler function of the public line network is disabled by the ANSam signal and the full duplex communication is enabled. When a calling station receives the ANSam signal from the called station, it sends a CM signal by the V.8 modulation to inform to the called station of executable transmission modes in the transmission of the image signal. When the called station receives the CM signal, it stops to send the ANSam signal and sends a JM signal by the V.8 modulation. The called station informs to the calling station by the JM signal of transmission modes executable by the called station, among the executable transmission modes informed by the CM signal. When the calling station receives the JM signal, it stops sending the CM signal and sends a CJ signal by the V.8 modulation. The calling station informs to the called station by the CJ signal of the transmission mode determined in accordance with the JM signal. When the called station receives the CJ signal, it stops sending the JM signal and proceeds to the reception of the line proving signal from the calling station.

On the other hand, the modem in the calling station sends the line proving signal (a signal modulated by V.34) for checking a status of the line 2a after the elapse of 50 msec from the stop of sending of the CJ signal. Since the break of signal during this period is 50 msec, the echo suppressor or echo canceler function of the public line network is kept disabled. On the other hand, when the modem of the called station receives the line proving signal, it sends an acknowledge signal (a signal by the V.34 modulation) to the line proving signal to inform to the calling station of a send level of a subsequent signal, correction of an amplitude level and a transmission baud rate and then proceeds to the reception of the long training signal from the calling station.

When the modem of the calling station receives the acknowledge signal, it stops sending the line proving signal and sends the long training signal by the V.34 modulation after the elapse of 50 msec from the stop of the sending. The modem of the called station conducts the adjustment of an equalizer of the modem 8 and the detection of the timing by the long training signal.

The modem of the calling station sends a parameter exchange signal by the V.34 modulation after the elapse of 50 msec from the sending of the long training signal. When the modem of the calling station receives the parameter exchange signal, it sends a parameter exchange acknowledge signal by the V.34 modulation and informs the modem of the calling station by the acknowledge signal of the subsequent link correction and the bit rate. The modem of the called station then sets the baud rate and the bit rate in accordance with the preset determination criteria. The called station sends, following the parameter exchange acknowledge signal, a CSI (called subscriber identification) signal and a DIS (digital identification signal) of the T.30 Recommendation by the V.34 modulation and sends a flag (dummy signal) until it receives a TSI (transmitting subscriber identification) signal and a DCS (digital command signal) of the T.30 Recommendation from the calling station.

When the calling station receives the CSI and DIS signals, it stops sending the parameter exchange signal, sends the TSI and DCS signals by the V.34 modulation and sends a flag until it receives a CFR signal from the called station. On the other hand, when the called station receives the TSI and DCS signals from the calling station, it stops sendimg the flag and sends the CFR signal by the V.34 modulation.

When the calling station receives the CFR signals, it stops sending the flag, and after the elapse of 50 msec, it sends the image signal by the transmission mode which has been set in the previous procedure, and the called station receives the image signal in the set transmission mode. The transmission and reception of the image signal may be error retransmission communication by full duplex communication or error retransmission communication (ECM communication) by half duplex communication.

When the calling station is to send a next page of image signal in the same transmission mode after the transmission of the first page of image signal, it sends a PPS (partial page signal)—MPS (multi-page signal) signal (for the ECM of the T.30 Recommendation) after the elapse of 50 msec from the completion of the transmission of the image signal land sends a flag until it receives an MCF (message confirmation) signal from the calling station. When the transmission mode is to be changed to send the next page, the calling station sends a PPS-EOM signal instead of the PPS-MPS signal.

When the calling station receives the PPS-MPS signal following the image signal and the image signal is successfully received, it sends the MCF signal and proceeds to the reception of the next page of image signal.

When the calling station receives the MCF signal, it stops sending the flag, and after the elapse of 50 msec, it sends the next page of image signal. If it is the last page, it sends a PPS-EOP (end of procedure) signal after the elapse of 50 msec from the completion of the sending of the page of image signal and sends the flag until it receives the MCF signal from the called station. In the above process, since the signal break longer than 50 msec does not take place, the echo suppressor or echo canceler function is kept disabled.

When the calling station receives the MCF signal from the called station, it stops sending the flag and send a DCN (disconnect) signal.

In the above V.8 and V.34 protocol, when the calling station or the called station does not receive the acknowledge signal for the protocol signal it sent within the predetermined period from the start of sending of the protocol signal to the destination station, it shifts to a protocol by the half duplex communication in accordance with the T.30 Recommendation. In this case, the half duplex communication protocol is executed from the sending of NSF (non-standard facilities), CSI and DIS signals from the called station.

Figure 3B:
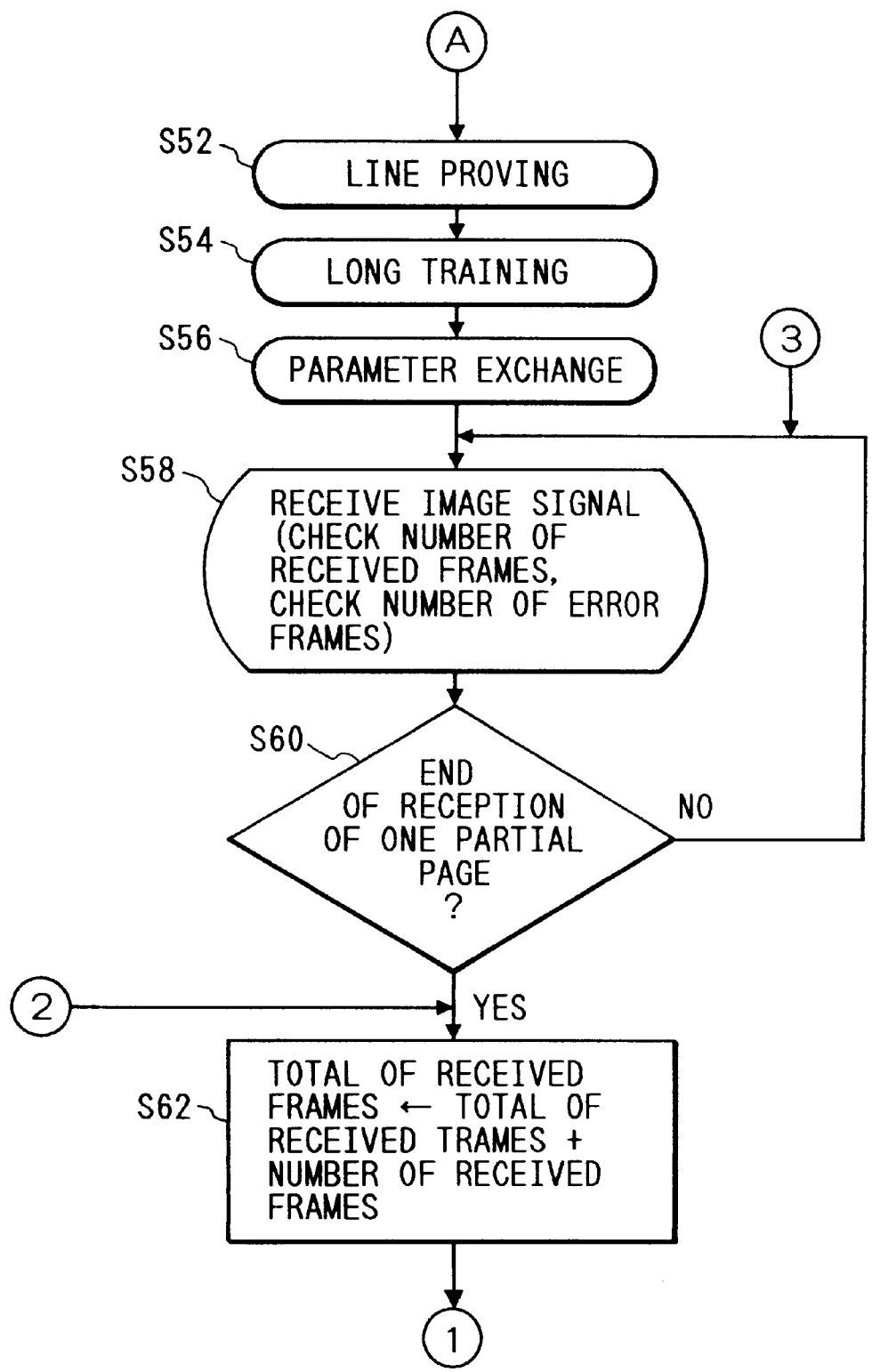
Figure 4:
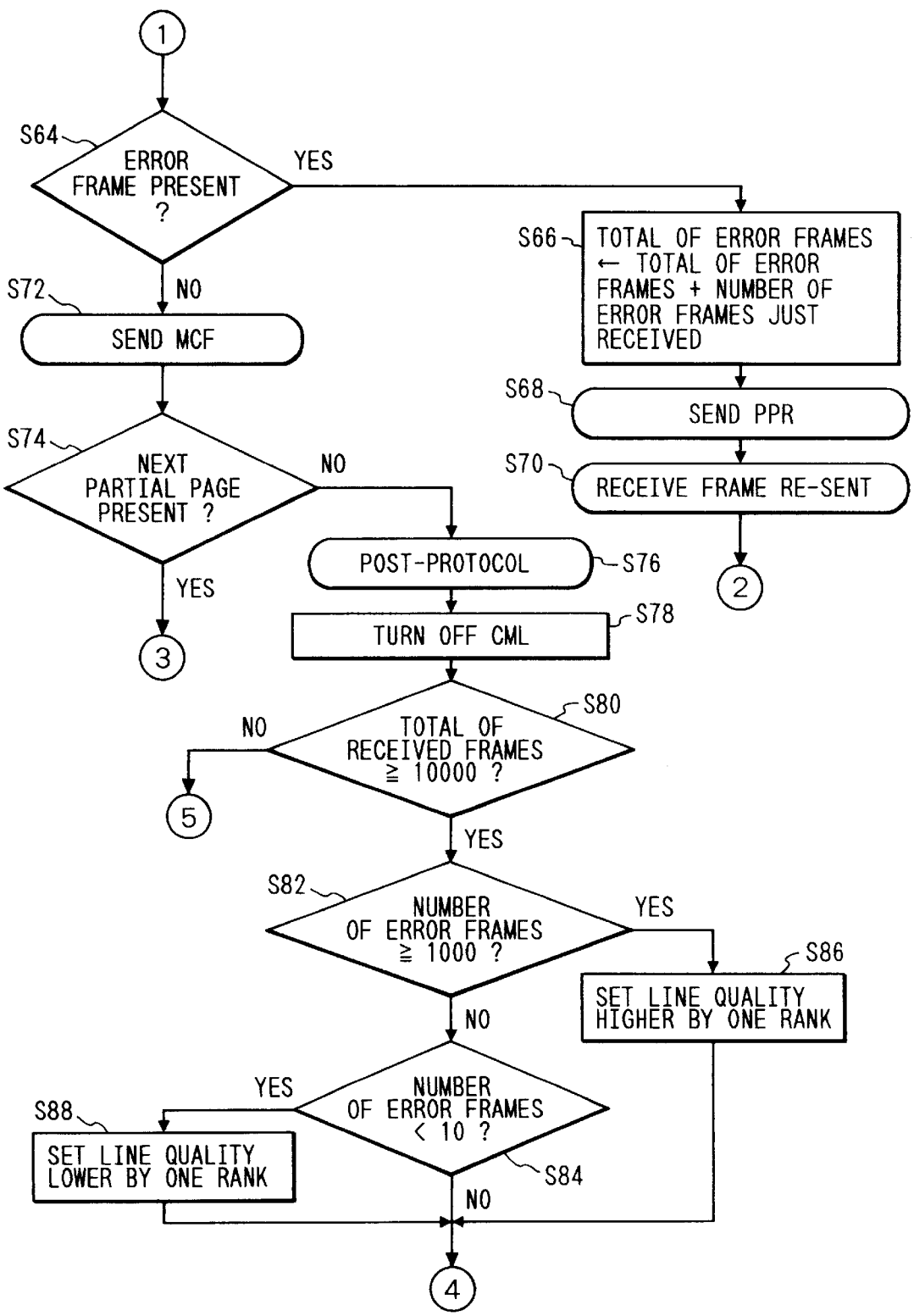
FIG. 4 shows a flow chart of a control operation of the embodiment.
Figure 5:
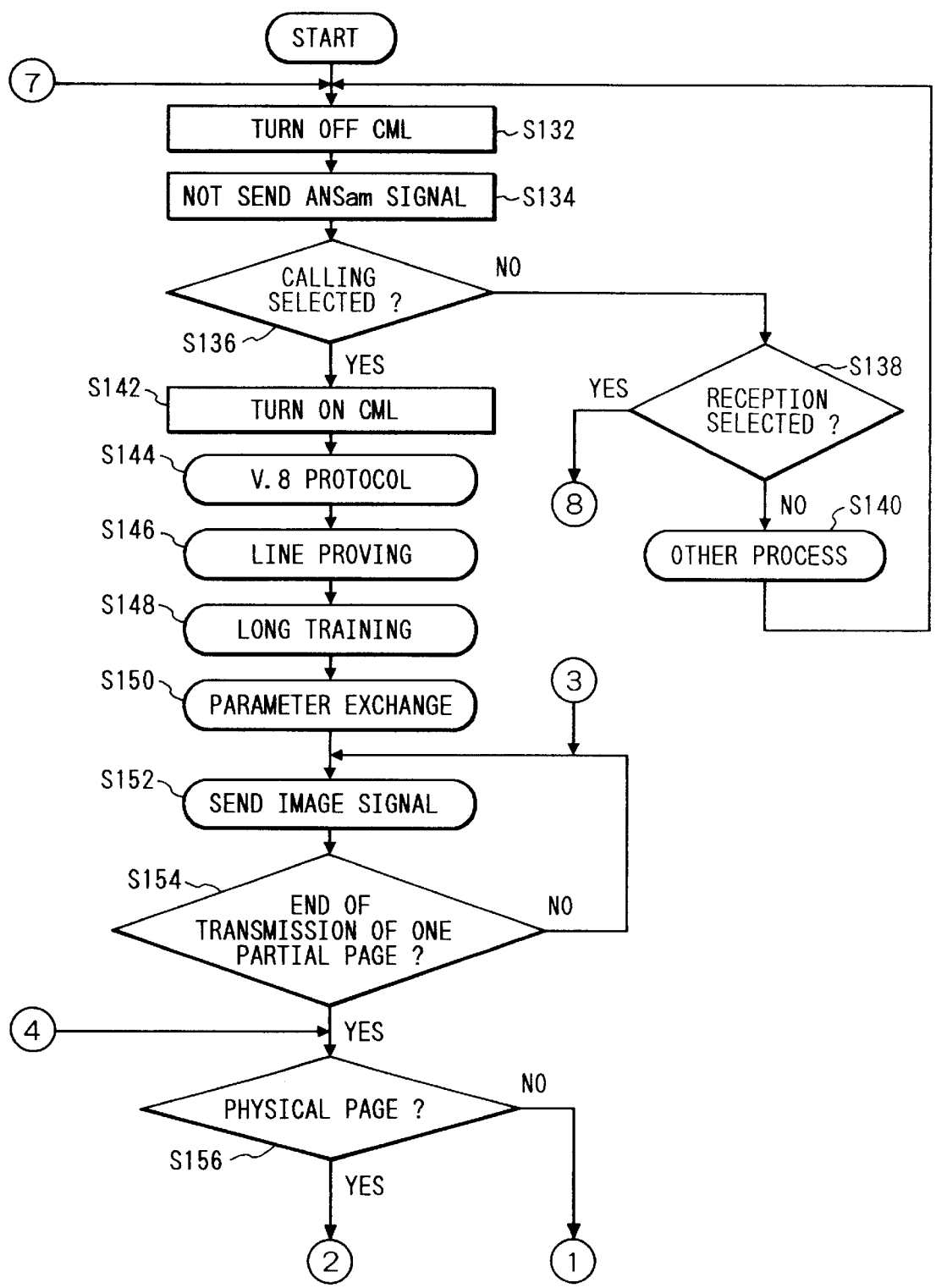
FIG. 5 shows a flow chart of a control operation of other embodiment.
Figure 6:
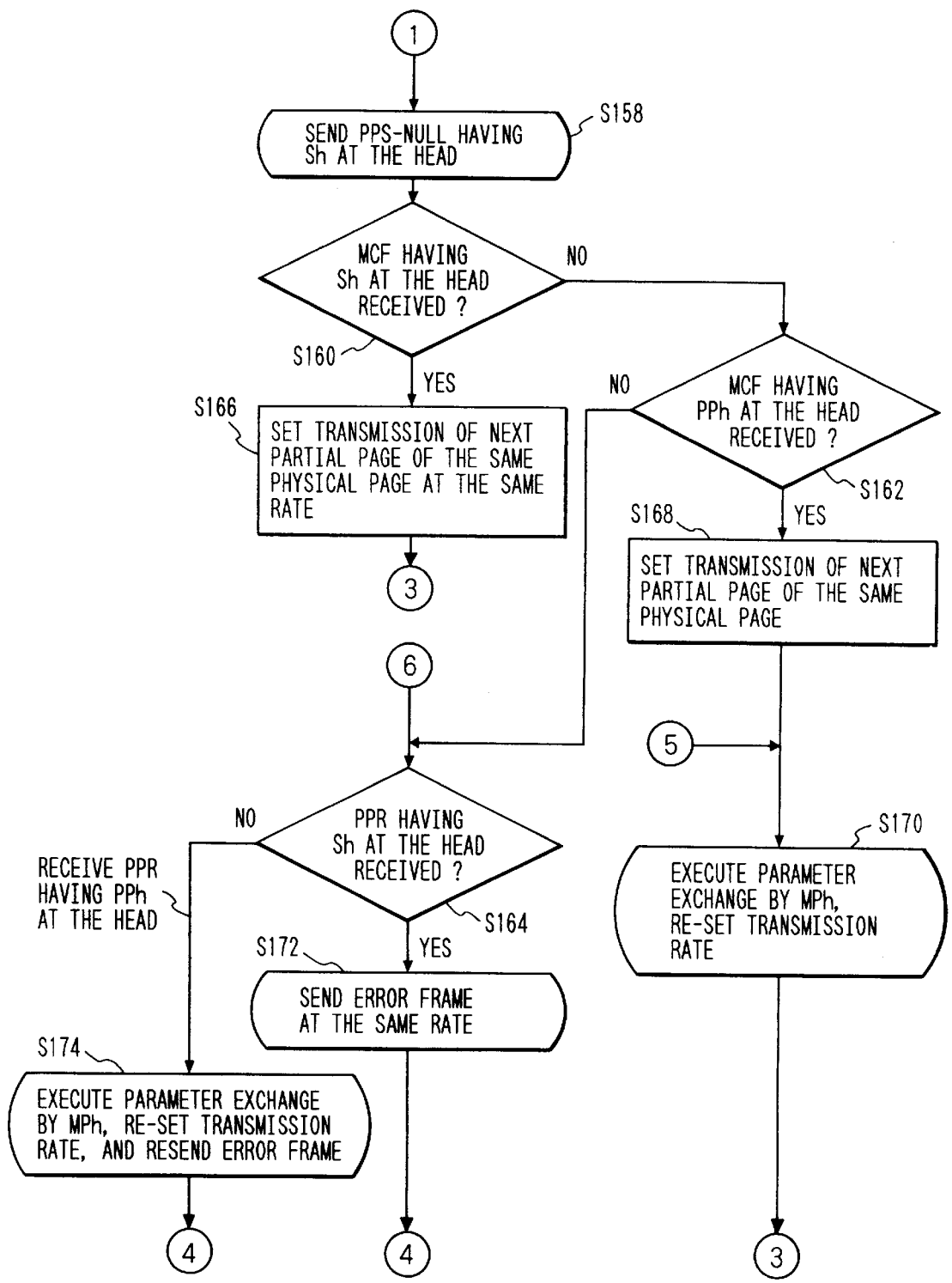
FIG. 6 shows a flow chart of a control operation of other embodiment.
Figure 7:
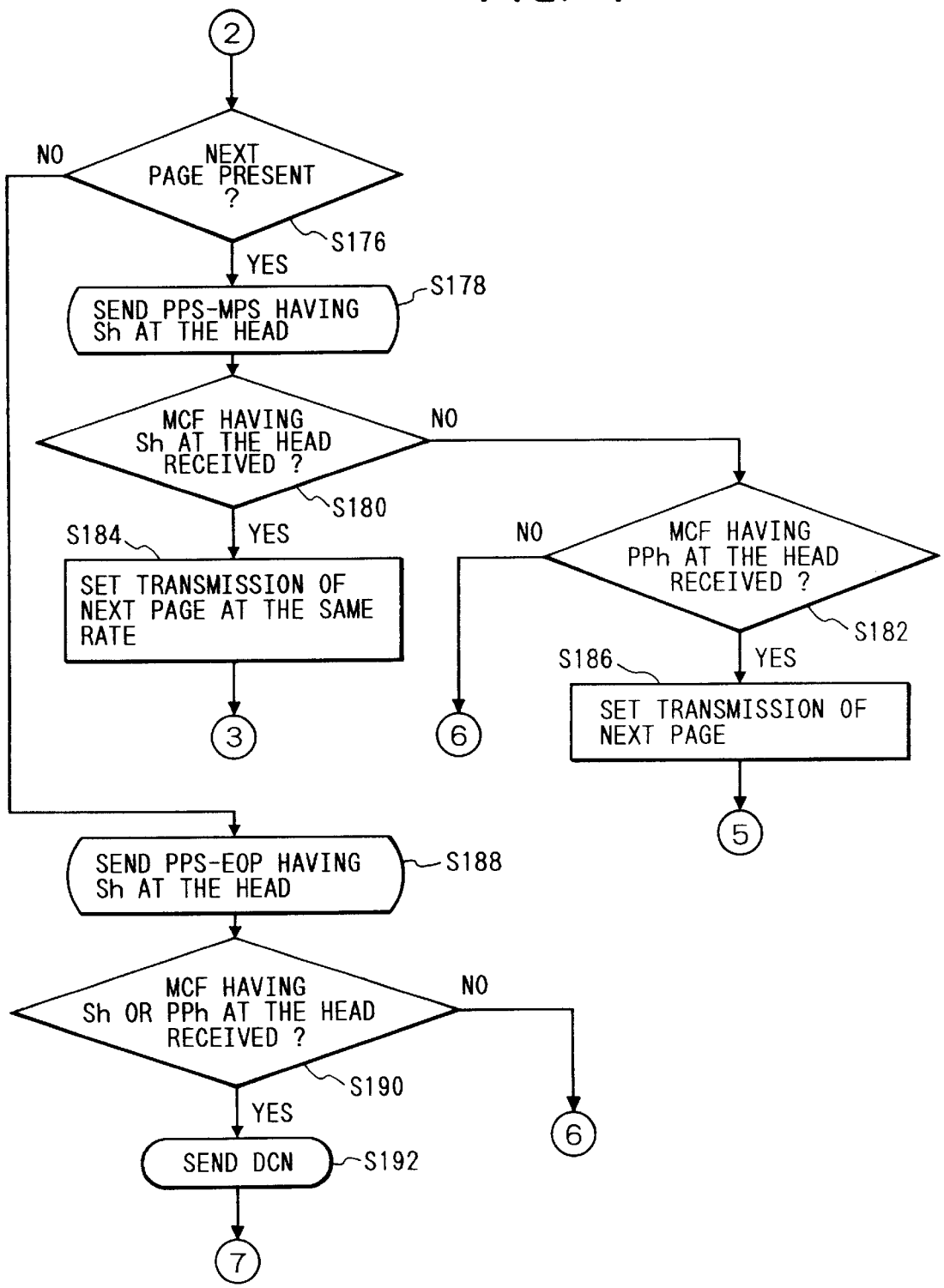
FIG. 7 shows a flow chart of a control operation of other embodiment.
Figure 8:
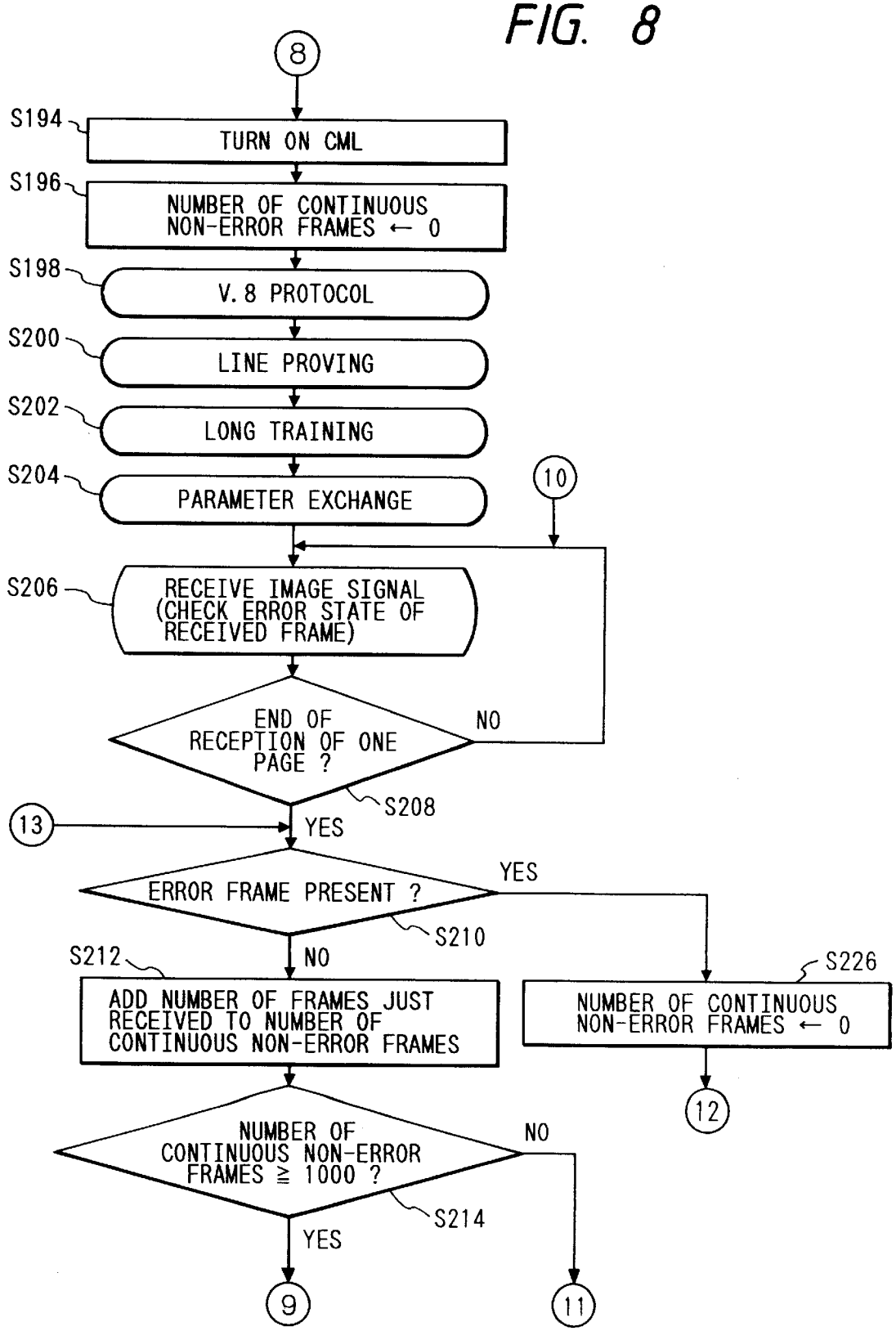
FIG. 8 shows a flow chart of a control operation of other embodiment.
Figure 9:
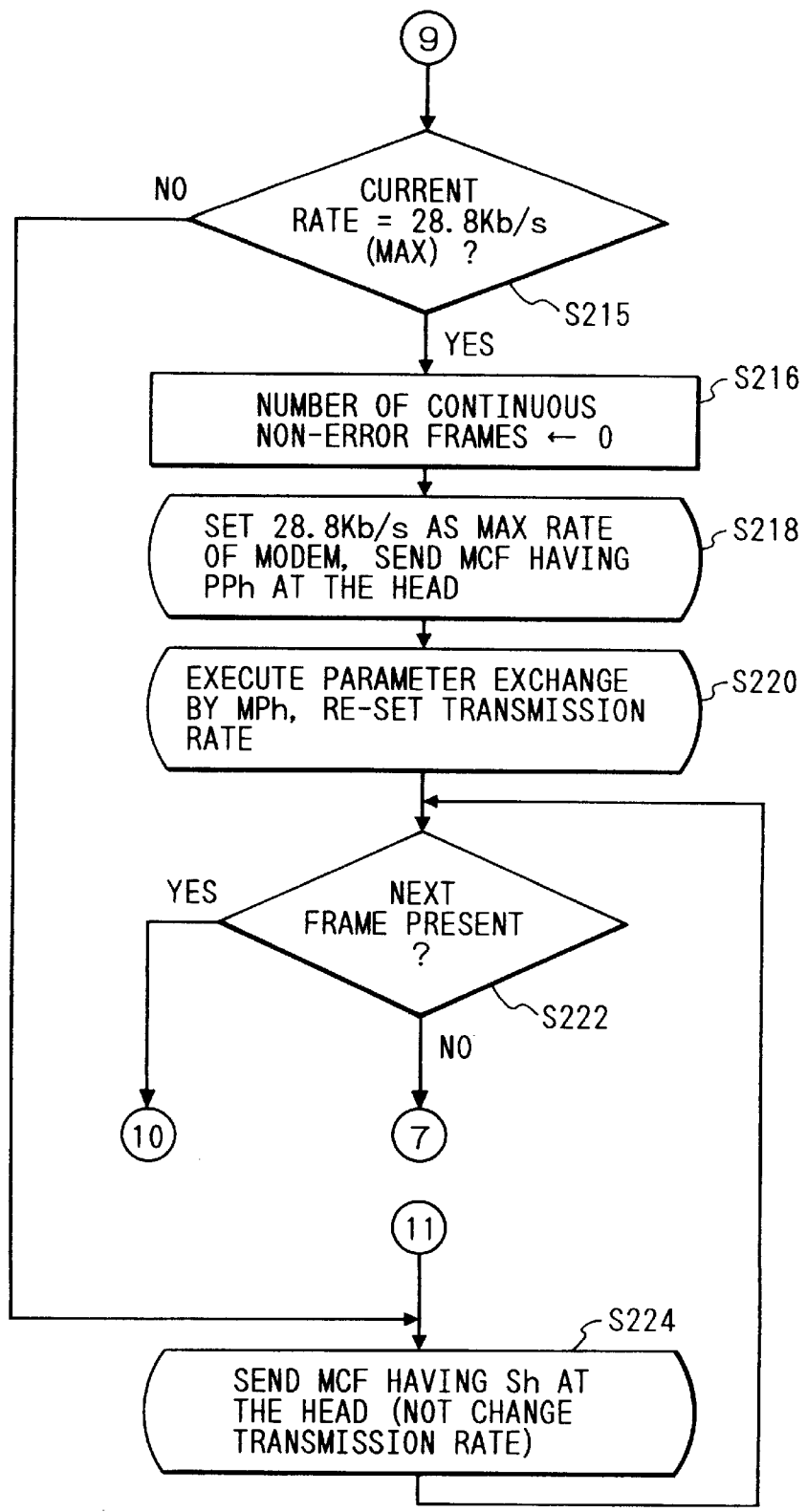
FIG. 9 shows a flow chart of a control operation of other embodiment.
Figure 10:
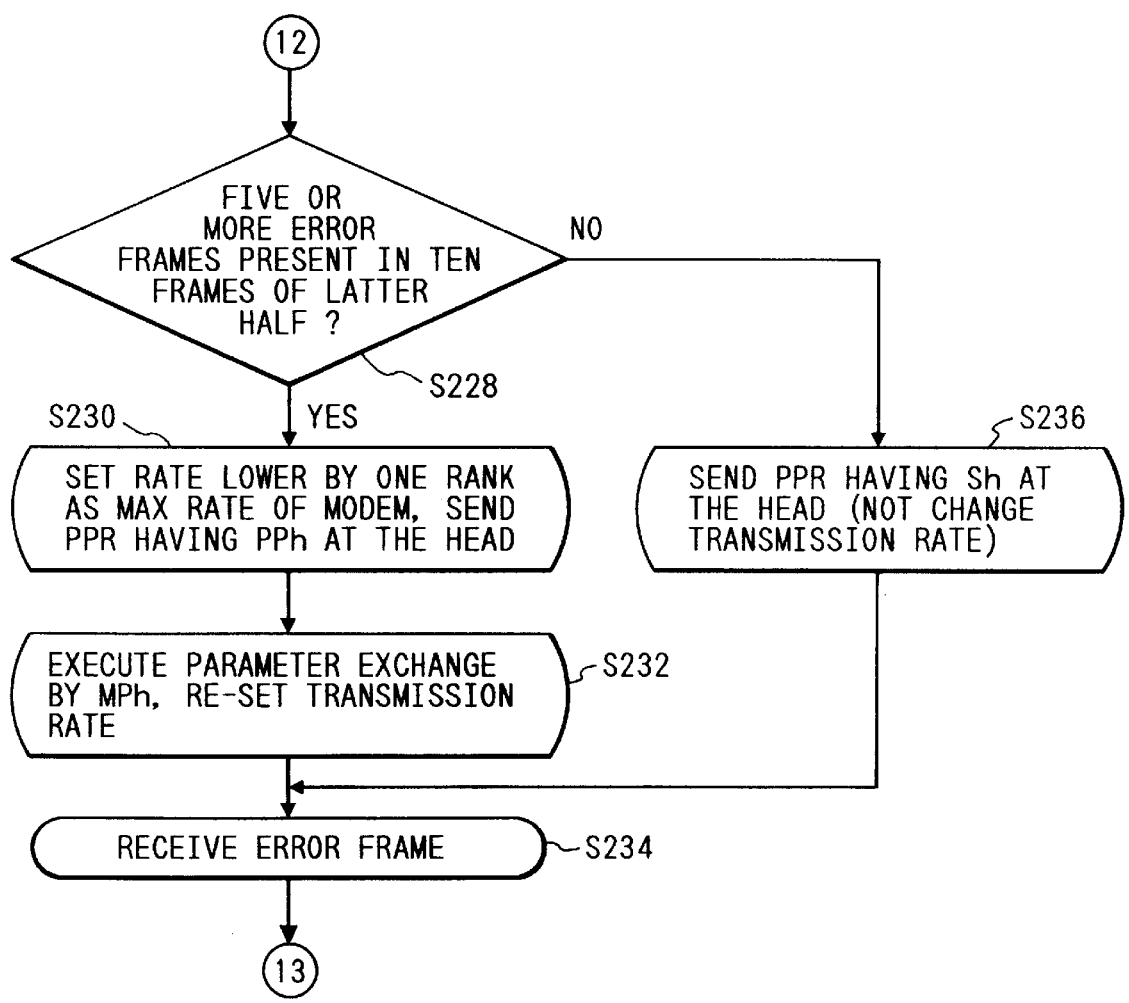
FIG. 10 shows a flow chart of a control operation of other embodiment.

FIGS. 3A and 3B show flow charts of a control operation of the control circuit 20 of the present embodiment.

In S32, a default value (criterion 3) is set as a criterion to determine a line quality of the modem through the signal line 20d.

In S34, the total number of received frames is set to 0, and in S36, the total number of received error frames is set to 0.

In S38, a signal of a signal level '0' is outputted to the signal line 20a to turn off the CML relay.

In S40, a signal of the signal level '0' is outputted to the signal line 20b to set not sending the ANSam signal.

In S42, whether the reception of the call has been selected or not is determined, and if it has, the process proceeds to S48, and if it has not, the process proceeds to S46 to conduct other process.

In S48, a signal of a signal level '1' is outputted to the signal line 20a to turn on the CML relay.

In S50, the V.8 protocol is executed, in S52, the line grouping signal is received, in S54, the long training signal is received, and in S56, the parameter exchange is executed by the modem 8.

In S58, the ECM (error correction mode) reception of the image signal is conducted. The number of received frames is counted and the received error frames are recognized.

In S60, whether the reception of one partial page has been completed or not is determined, and if it is completed, the process proceeds to S62, and if it is not completed, the process proceeds to S58.

In S62, the number of frames received this time is added to the total number of received frames.

In S64, whether an error frame is included in the partial page received this time or not is determined, and if the error frame is included, the process proceeds to S66, and if the error frame is not included, the process proceeds to S72.

In S66, the number of error frames in the frame received this time is added to the total number of received error frames.

In S68, a PPR (partial page request) signal is sent.

In S70, a retransmission frame is received.

In S72, An MCF signal is sent.

In S74, whether a next partial page is included or not is determined, and if the next partial page is included, the process proceeds to S58, and if the next partial page is not included, the process proceeds to S76 to conduct a post procedure of the V.34.

In S78, a signal of the signal level '0' is outputted to the signal line 20a to turn off the CML relay.

In S80, whether the total number of received frames has exceeded 10,000 frames or not is determined, and if it exceeds 10,000 frames, the process proceeds to S82, and if it is less than 1,000 frames, the process proceeds to S38.

In S82 and S84, whether the number of received error frames is 1,000 frames or more, that is, if there are 10% or more errors or not is determined. If the error are 1,000 frames or more, the process proceeds to S86 and the determination criterion for the modem is set one step severer, that is, the determination criterion of five ranks for the line quality is one rank increased, through the signal line 20d. If the number of received error frames is less than 10 frames, the determination criterion of the modem is set one step less sever. Namely, the determination criterion of the line quality is decreased by one. When the number of error received frames are no less than 10 and less than 1,000, it is determined that the determination criterion of the line quality of the modem is proper and the setting criterion of the modem is not changed.

In the present embodiment, the control circuit 20 changes the determination criterion of the line quality of the modem 8 in accordance with the error status of the data received through the modem to set more proper baud rate and bit rate for the subsequent transmission by the modem.

However, the bit rate automatically set by the modem 8 may be changed in accordance with the error status of the received data during the communication of a series of data. An embodiment modified therefor is explained below.

In the modified embodiment, the control circuit 20 selects whether it sends the PPR signal starting with PPh indicating the change of the transmission bit rate or the PPR signal starting with Sh indicating the non-change of the transmission bit rate according to the error status of the received frame data in the communication sequence of the ECM shown in FIG. 2.

The Sh signals are sent alternately at a point 0 of a quarter special constellation arrangement and a point rotated by 90 degrees counterclockwise. This signal subsequently does not exchange the MPh signal and does not change the transmission bit rate of the image signal.

The PPh signal comprises four periods of an eight-symbol sequence and is used in the half duplex mode for the initialization and the resynchronization of the control channel receive unit. This signal subsequently exchanges the MPh signal and changes the transmission bit rate of the image signal.

The MPh signal is exchanged between the modems during the start-up and the control channel resynchronization. It includes a modulation parameter used in the image signal transmission. For example, the control circuit 20 monitors specific frames of the latter half (ten frames) and if the error rate of those frames is 50% or more, a main processor commands to the modem to reduce the transmission rate and determines the transmission rate by the MPh signal. It monitors the specific frames (ten frames) of the latter half and if the error rate of this frames is less than 50%, it sends the PPR signal starting with the Sh signal to conduct the reception of the retransmission frame at the same rate.

If no error is included in the received frame and the rate is not changed (for example, 100 continuous frames of no error have not been received), it sends the MCF signal starting with the Sh signal, and when the rate is to be changed (for example, 100 continuous frames of no error have been received), it sends the MCF signal starting with the PPh signal. If the current transmission rate is the maximum rate, the transmission rate cannot be raised any more and the change of the rate is not conduced.

FIGS. 5 to 10 show flow charts of the control operations of the control circuit 20 in the other embodiment.

In S132, a signal of the signal level '0' is outputted to the signal line 20a to turn off the CML relay.

In S134, a signal of the signal level '0' is outputted to the signal line 20b to set not sending the ANSam signal.

In S136 and S138, whether the calling and the reception of the call have been selected or not is determined, respectively, and if the calling is selected, the process proceeds to S142, if the reception of call is selected, the process proceeds to S194, and if none is selected, the process proceeds to S140 to conduct other process.

In S142, a signal of the signal level '1' is outputted to the signal line 20a to turn on the CML relay, and the V.8 protocol is set by the modem 8 (S144), the baud rate is determined by the line grouping signal (S146), the long training signal is sent (S148) and the transmission rate is determined by the parameter exchange (S150).

In S152, the image signal is sent. When the transmission of one partial page is completed (S154), the process proceeds to S156, and if the transmission of one partial page has not been completed, the process proceeds to S152.

In S156, whether it is a physical page or not is determined, and if it is the physical page, the process proceeds to S176, and if it is not the physical page, the process proceeds to S158.

In S158, a PPS-NULL signal starting with Sh is sent and the signal is received, in S160, S162 and S164, it is determined, and if the MCF starting with Sh is received, the transmission of the next partial page of the same physical page is set to the same transmission rate in S166, and when the MCF starting with PPh is received, the transmission of the next partial page of the same physical page is set in S168, the parameter is exchanged by MPh to redetermined the transmission rate in S170, and when the PPR starting with Sh is received, the error frame is sent at the same transmission rate in S172, and when the PPR starting with PPh is received, the parameter is exchanged by MPh, the transmission rate is redetermined and then the error frame is resent.

In S176, whether the next page is present or not is determined, and if the next page is present, the process proceeds to S178 to receive the PPS-MPS starting with Sh, and if the next page is not present, the process proceeds to S188 sending the PPS-EOP starting with Sh.

In S180 and S182, the reception of the signal for the transmission of the PPS-MPS is determined, and if the MCF signal starting with Sh is received, the transmission of the next page is set to the same transmission rate in S184, and if the MCF starting with PPh is received, the transmission of the next page is set in S186, and if the PPR starting with Sh or PPh is received, the process proceeds to S164.

In S190, the reception of the signal for the transmission of the PPS-EOP is determined, and if the MCF signal starting with Sh or PPh is received, the DCN is sent in S192, and if the PPR starting with Sh or PPh is received, the process proceeds to S164.

In S194, a signal of the signal level '1' is outputted to the signal line 20a to turn on the CML relay.

In S196, the number of frames of continuous no-error is cleared.

In S198, the V.8 protocol is set, in S200, the baud rate is determined by the reception of the line proving signal, in S202, the long training signal is received and in S204, the parameter is exchanged to determine the transmission rate.

In S206, the image signal is received and the error status of the received frame is checked and stored.

In S208, whether the reception of one page has been completed or not is determined, and if the reception of one page has been completed, the process proceeds to S110, and if the reception of one page has not been completed, the process proceeds to S206.

In S210, whether an error frame is present or not is determined, and if it is present, the process proceeds to S226 to clear the number of frames of continuous no-error, and if the error frame is not present, the process proceeds to S212 to add the number of frames received this time to the number of frames of continuous no-error, and whether the resulting number of frames reaches 1,000 or not is determined in S214. If it reaches 1,000, the process proceeds to S215, and if it is less than 1,000, the process proceeds to S224.

In S215, whether the current transmission rate is 28.8K b/s (maximum transmission rate) or not is determined, and if it is 28.8K b/s, the rate is not changed and the process proceeds to S224, and if it is not 28.8K b/s, the process proceeds to S216 to change the rate.

In S216, the number of frames of continuous no-error is cleared.

In S218, the maximum transmission rate of 28.8K b/s is set to the modem and the MCF starting with PPh is sent. Thus, the transmission rate may be set up to 28.8K b/s.

In S220, the parameter is exchanged by MPh and the transmission rate is redetermined.

In S222, whether a next page is present or not is determined, and if the next frame is present, the process proceeds to S206, and if it is not present, the process proceeds to S132.

In S224, the MCF starting with Sh is sent. The transmission rate is not changed.

In S228, whether five or more errors are included in the latter half ten frames or not is determined, and if the error frames do not exceed ten frames, whether errors are included in five or more frames or not is determined. If errors are included in five or more frames, the process proceeds to S230, and if the errors are in less than five frames, the process proceeds to S236.

In S230, a transmission rate which is one step lower than the maximum transmission rate currently set to the modem is set, the PPR starting with PPh is sent, and in S232, the parameter is exchanged by MPh and the transmission rate is redetermined.

In S234, the error frame is received.

In S236, the PPR starting with Sh is sent. The transmission rate is not changed.

FIGS. 11A to 11D show a protocol in the other embodiment.

In FIG. 11A, the PPR starting with Sh is sent. Namely, it is the transmission without changing the transmission rate. In FIG. 11B, the PPR starting with PPh is sent. Namely, it is the transmission with the change of transmission rate. In FIG. 11C, the MCF starting with Sh is sent. Namely, it is the transmission of the MCF without changing the transmission rate. In FIG. 11D, the MCF starting with PPh is sent. Namely, it is the transmission with the change of the transmission rate.

In accordance with the present embodiment, the transmission rate (transmission bit rate) can be appropriately changed in accordance with the error status of the data received through the modem 8 during the coimnunicatlon of a series of image data.

It should be understood that the present invention is not limited to the above embodiments but various modifications thereof may be made.

What is claimed is:

1. A data communication apparatus comprising:
   a modem device having a function of determining a line quality and setting a transmission baud rate and a transmission bit rate in accordance with line quality criteria and a result of the determination, said modem device modulating input digital data to analog signals to output the modulated analog signals to a communication line, or demodulating analog signals from the communication line to digital data to output the demodulated digital data;

processing means for supplying digital data to be transmitted to said modem device as input digital data, and processing the demodulated digital data from said modem device as received digital data; and control means for setting the line quality criteria to said modem device, analyzing demodulated data output from said modem device, and changing the line quality criteria set in said modem device in accordance with an error status of the demodulated data.

2. A data communication apparatus according to claim 1 wherein said modem device determines the line quality by generating a signal corresponding to an error pattern, and said control means changes the line quality criteria set in said modem device in accordance with the error status of the received data.

3. A data communication apparatus according to claim 1 wherein said modem device transmits and receives data in accordance with the V.34 protocol.

4. A data communication apparatus for communicating with a protocol signal and data in accordance with the V.34 comprising:

a modem device having a function of determining a line quality and setting a transmission baud rate and a transmission bit rate in accordance with line quality criteria and a result of the determination, said modem device modulating input digital data to analog signals to output the modulated analog signals to a communication line, or demodulating analog signals from the communication line to digital data to output the demodulated digital data;

processing means for supplying digital data to be transmitted to said modem device as the input digital data, and processing the demodulated digital data from said modem device as received data; and control means for setting the line quality criteria to said modem device, analyzing demodulated data output from said modem device, and changing the line quality criteria set in said modem device in accordance with an error status of the demodulated data.

5. A data communication apparatus according to claim 4 wherein said control means causes said modem device sending a protocol signal including information indicating the change of the transmission bit rate in accordance with the error status of the received data.

6. A data communication apparatus according to claim 4 wherein said communication means causes said modem device sending a protocol signal not including information indicating the change of the transmission bit rate when no error is included in the received data.

7. A data communication method for communicating data by using a modem device having a function of determining a line quality and setting a transmission baud rate and a transmission bit rate in accordance with line quality criteria and a result of the determination, comprising the steps of:

setting the line quality criteria to said modem device;

analyzing demodulated data output from said modem device; and changing the line quality criteria set in said modem device in accordance with an error status of the demodulated data analyzed in the analyzing step.

8. A data communication method according to claim 7 wherein said modem device determines the line quality by generating a signal corresponding to an error pattern of the received signal.

9. A data communication method according to claim 7 wherein said modem device sends a protocol signal including information indicating the change of the transmission bit rate in accordance with the error status.

10. A data communication method according to claim 7 wherein said modem device sends a protocol signal not including information indicating the change of the transmission bit rate when no error is included in data received by said modem device.

* * * * *

UNITED STATES PATENT AND TRADEMARK OFFICE
CERTIFICATE OF CORRECTION

PATENT NO. : 5,943,364
DATED : August 24, 1999
INVENTOR(S) : TAKEHIRO YOSHIDA

It is certified that error appears in the above-identified patent and that said Letters Patent is hereby corrected as shown below:

COLUMN 3

Line 41, "to send" should read --sending--.

COLUMN 4

Line 30, "semding" should read --sending--,
    Line 46, "land" should read --and--; and
    Line 66, "send" should read --sends--.

COLUMN 5

Line 53, "An" should read --an--.

COLUMN 6

Line 1, "error" should read --errors--;
    Line 49, "this" should read --these--; and
    Line 60, "conduced." should read --performed.--.

COLUMN 7

Line 28, "redetermined" should read --redetermine--.

COLUMN 8

Line 58, "coimnunicatlon" should read --communication--.

UNITED STATES PATENT AND TRADEMARK OFFICE
CERTIFICATE OF CORRECTION

PATENT NO. : 5,943,364
DATED : August 24, 1999
INVENTOR(S) : TAKEHIRO YOSHIDA

It is certified that error appears in the above-identified patent and that said Letters Patent is hereby corrected as shown below:

<u>COLUMN 10</u>

```
Line 8, "sending" should read --to send--; and
Line 13, "sending" should read --to send--.
```

Signed and Sealed this

Twelfth Day of September, 2000

Attest:

Q. TODD DICKINSON

Attesting Officer

Director of Patents and Trademarks